Patented Oct. 4, 1949

2,483,550

UNITED STATES PATENT OFFICE 2,483,550

PROCESS OF MAKING HIGH SUGAR CONTENT JELLIES

Herbert T. Leo, Clarence C. Taylor, and John W. Lindsey, Anaheim, Calif.

No Drawing. Application November 20, 1946, Serial No. 711,196

4 Claims. (Cl. 99—132)

This invention relates to pectinic acids susceptible to precipitation by dissolved ionized calcium compounds and to the preparation of sugar jellies from such pectinic acids.

Reference is made to our copending application Serial No. 616,654, filed September 15, 1945, now abandoned, and entitled "Novel type of pectic substance and method of preparing the same." This copending application discloses a method of preparing a novel type of pectic substance generally characterized by complete solubility in distilled water only when containing not more than about 2% calcium ash; when in pure form, by capacity for curdling milk; in some instances, by higher susceptibility to precipitation by ionized soluble calcium compounds and the like than conventional types of calcium precipitable pectinic acids; by high jelly grades; by capacity for forming, in the absence of sugar, both acid and neutral jellies of high strength in which jelly formation is wholly due to calcium precipitation; when admixed with sodium citrate or the like, by capacity for forming firm, custard-like milk jellies; by capacity for forming acid and neutral jellies containing as much as 65% or more sugar in which jelly formation is at least partially due to calcium precipitation; by capacity for forming, in the absence of calcium, acid jellies containing as much as 65% or more sugar in which jelly formation is wholly due to the sugar and hydrogen ion content of the jelly batch; and, when used for the preparation of sugar jellies of the last mentioned type, by setting times that range from about 3 minutes to 27 or more minutes.

These novel pectic substances may be prepared from pectin by treatment with an enzyme (pectase) under the specific conditions disclosed in said copending application, in particular, at a pH of 5.3 or higher maintained by addition of calcium carbonate or other neutralizing agent selected from the class consisting of alkaline earth metal salts and magnesium compounds. The effect of such treatment with pectase under the indicated conditions may be more or less incomplete demethoxylation of the pectin used as the starting material. Such demethoxylation as may take place is not of the same nature and effect as that brought about by acid or alkaline media in the absence of pectase.

These novel pectic substances can be classified, under the terminology outlined in said copending application (which is adopted herein), when water soluble, as pectins, and may also be designated as pectinic acids or as acid pectinates. All the jellying reactions and other characteristics of our novel pectic substances are not exhibited in combination by any one of the pectins or pectinic acids or other pectic substances with which we are familiar, and we have therefore used the novel term "pectinylic acid" to designate these novel pectic substances.

Particular attention is directed to the characteristic capacity of certain pectinylic acids for forming slow setting jellies containing 65% or more sugar in the absence of calcium compounds. The preparation of 65% or more concentrated sugar jellies of this type from pectinylic acids offers many advantages over conventional methods of preparing jellies of like sugar concentration from conventional pectins, as will become apparent from the following discussion.

Jellies utilizing to the maximum extent the inherent jelly forming capacity of pectinic acid require some time for setting, i. e. for building up the internal jelly structure to which the firmness of the jellies is due. Further, when pectinic acid sugar jellies are formed quickly, the jellies are formed under pressure or internal strain, and syneresis may occur on standing of the jellies, especially at low pH values or when relatively small amounts of pectin are used. When pectinic acid sugar jellies are formed over a prolonged period of time, i. e. when the pectinic acid has a low temperature of set and a long time is required for cooling to this low temperature of set, jellies are formed having a strong internal structure free from internal strain.

Certain pectinylic acids are characterized by a long setting time (determined by the preparation of 65% sugar jellies in the absence of calcium) or, more accurately, a low temperature of set, and are therefore particularly suitable for the preparation of jellies containing 65% or more sugar of the type obtainable in the absence of calcium. Further, as pointed out in copending application Serial No. 711,195, filed of even date herewith, the above mentioned slow setting pectinylic acids can be prepared without any loss in jelly grade, whereas when slow setting pectins are prepared from quick setting pectins by conventional methods such as treatment with acids, such treatment usually entails a loss in jelly grade of around 10%.

The savings obtainable by the use of the compositions and methods of the present invention will become apparent from a comparison with the methods disclosed in the patent to Thompson et al. No. 2,059,541 for the preparation of jellies containing more than 65% sugar. As disclosed in said patent, not more than 40 lbs. of sugar or its equivalent can be used with 1 lb. of 100 grade pectin, if satisfactory jellies are to be obtained. Note that 1 lb. of 100 grade pectin is inherently capable of forming a satisfactory jelly with 100 lbs. of sugar. In other words, in this patented method only 40% of the inherent jelly forming capacity of the pectin employed is actually utilized. By the methods of the present invention, on the other hand, we can prepare firm jellies containing more than 65% sugar in which the amount of sugar for each pound of 100 grade pectin will be at least 64 lbs. and may be as high as 100 lbs.

Since practically all water from ordinary sources and all fruits and vegetables, including derivatives thereof such as sugar, glucose, dextrose, pectin, pectinylic acid and the like, fruit juices, and other conventional ingredients of jellies contain substantial amounts of soluble, ionizable calcium compounds (unless specially treated to remove such calcium compounds), special methods must in many instances be used to prepare from pectinylic acids 65% or more concentrated sugar jellies of the type obtainable in the complete absence of soluble, ionizable calcium compounds.

The necessity for the use of such special methods, and the nature of the difficulties avoidable by the use of such special methods, will become apparent from the following discussion.

In general, it may be stated that the effect of treating pectin with pectase under the conditions of our said copending application Serial No. 616,654 is twofold. First, the pectase treatment modifies the setting time or, more accurately, the setting temperature (for explanation of this term see our Patent No. 2,173,260) of the pectinylic acids when employed to make 65% sugar jellies in the absence of calcium. The methods of the present invention are directed particularly to the preparation of jellies from pectinylic acids characterized by a long setting time or low temperature of set.

Secondly, treatment with pectase renders the treated pectin progressively more susceptible to precipitation or insolubilization by soluble, ionizable calcium compounds.

In connection with the last mentioned feature, it should be noted that the calcium susceptibility of a pectinylic acid can be measured in terms of the solubility (in the absence of sugar) at various pH values of the calcium-pectinylic acid combination, for the more calcium susceptible a pectinylic acid is, the lower the pH required to dissolve the calcium combination of the pectinylic acid. For instance, a limited pectase treatment may yield a product whose calcium combination, while soluble at a pH of 3.0, is insoluble at a pH of 4.0. More prolonged or intensive pectase treatment may yield a product the calcium combination of which is soluble at a pH of 2.0 while insoluble at a pH of 3.0.

Further, in the case of any given pectinylic acid, its calcium combination is rendered more insoluble by the presence of sugar. Thus, at a pH of 4.0, the calcium combination of a certain pectinylic acid may be freely soluble to a thin syrup in the absence of sugar, soluble in the form of a thick syrup in a 65% sugar solution, and completely insoluble in an 80% sugar solution.

It will be understood that pectinylic acid sugar jellies (of the type obtainable in the absence of calcium) can be formed only from dissolved or dispersed pectinylic acids. If part or all of the pectinylic acid intended for preparation of 65% or more concentrated sugar jellies of said type cannot be dissolved, or is precipitated after dissolution but before or while the sugar jelly is formed (due to the formation of insoluble calcium-pectinylic acid combinations), then the undissolved or precipitated pectinylic acid is not available for the formation of a sugar jelly of the type obtainable in the absence of soluble, ionizable calcium compounds.

As disclosed in our said copending application Serial No. 616,654, we have found it possible to prepare 65% or more concentrated sugar jellies (of the type obtainable in the absence of calcium) in spite of the presence of soluble, ionizable calcium compounds by the use of alkali metal salts of weak organic acids that form water insoluble calcium salts. The preferred alkali metal salt is sodium citrate. Such a salt does not function simply as a buffer salt, for the same effect is not obtained by the use of sodium acetate or a like buffer salt derived from a weak organic acid forming water soluble calcium salts. Sodium citrate ordinarily will not effect a pH much in excess of 4.50, and at the pH of 4.50 certain pectinylic acids are still susceptible to the influence of soluble, ionizable calcium compounds, since at a pH of 4.50 traces of calcium citrate or the like may be dissolved. At a pH of 4.50, the calcium susceptibility of said pectinylic acids is very decidedly increased by the presence of 65% or more sugar. At lower pH values than 4.00, all pectinylic acids are susceptible to the presence of soluble ionizable calcium compounds even when sodium citrate or the like is employed, particularly at a sugar concentration of 65% or higher, since calcium citrate and the like are appreciably soluble at pH values below 4.0. At pH values between 4.0 and 6.0, some pectinylic acids are susceptible to precipitation by calcium even in the presence of sodium citrate.

The preceding discussion will show that there is an actual need for methods of preparing, from pectinylic acids and other materials containing soluble ionizable calcium compounds, 65% or more concentrated sugar jellies of the type obtainable in the absence of soluble, ionizable calcium compounds. More particularly, there is a specific need for methods of the nature indicated operative at pH values below 4.00. There is a corresponding need for pectinylic acid compositions capable, in the presence of soluble, ionizable calcium compounds and over a broad range of pH values extending below 4.00, of yielding 65% or more concentrated sugar jellies of the type obtainable in the complete absence of soluble, ionizable calcium compounds. These methods and compositions should be operative for the preparation of 65% or more concentrated sugar jellies without sacrificing any, or only a small fraction, of the jelly forming capacity inherent in the pectinylic acids employed.

We have now found that 65% or more concentrated sugar jellies (of the type obtainable in the complete absence of soluble, ionizable calcium compounds) can be prepared from pectinylic acids without sacrificing any, or only a small fraction, of the jelly strength of the pectinylic acids in the presence of soluble, ionizable calcium compounds and over a broad range of pH values extending to a pH of 2.00. We can carry out such preparations by incorporating, with the pectinylic acid or the dispersion thereof used for jelly making, a water soluble compound capable of sequestering calcium in but slightly ionized condition in an amount sufficient effectively to suppress the pectinylic acid-consuming alkaline earth-metal ion concentration. The preferred compound to be added is sodium hexametaphosphate.

It is therefore an important object of the present invention to provide compositions and methods for preparing 65% or more concentrated sugar jellies (of the type obtainable in the complete absence of soluble, ionizable calcium compounds) from pectinylic acids in the presence of soluble, ionizable calcium compounds at pH values not below 2.00 without sacrificing any, or only a small fraction, of the jelly forming capacity inherent in the pectinylic acids being employed for jelly making.

Another important object of this invention is to provide methods and compositions of the type indicated involving the use of a water soluble compound capable of sequestering calcium in unionized condition, in particular, sodium hexametaphosphate.

Other and further important objects and features of the present invention will become apparent to those skilled in the art from the following detailed disclosure and appended claims.

The principles and application of our present invention will be illustrated and brought out clearly by the following detailed description of a series of consecutively numbered experiments involving (A) the preparation of a slightly calcium susceptible and of a very calcium susceptible pectinylic acid, (B) the standardization of these two pectinylic acids, (C) the characterization of the standardized pectinylic acids by the preparation therewith of a number of 65% and 70% sugar jellies and (D) the preparation of 65% and more concentrated sugar jellies from these standardized pectinylic acids according to the methods of the present invention.

A. THE PREPARATION OF A SLIGHTLY CALCIUM SUSCEPTIBLE PECTINYLIC ACID AND A VERY CALCIUM SUSCEPTIBLE PECTINYLIC ACID

*Experiment 1*

The starting material is a coprecipitate of aluminum hydroxide and pectin such as may be prepared from a pectin extract of fruit or vegetable material by methods well known in the art. The coprecipitate may be formed by the specific novel method disclosed in our copending application Serial No. 687,956, now Patent No. 2,425,947. We prefer to filter off this coprecipitate from the extract in which it was formed and to compress the coprecipitate, as by means of a screw press such as a Leo press or by means of a filter press. The press cakes thus obtained are preferably shredded or disintegrated and screened, for instance, through a 4- or 8-mesh screen. The resulting granular product contains absorbed water, but feels relatively dry to the touch and is capable of absorbing relatively large amounts of water while retaining its granular form. One pound of the screened, shredded aluminum hydroxide-pectin coprecipitate fills almost exactly a quart container (after tamping). To 1 lb. of the pressed, shredded, sifted coprecipitate we can add 500 c. c. of water without increasing the volume of said 1 lb. of coprecipitate and without the appearance of practically any free liquid. This fact indicates a complete absorption of the said volume of water by the coprecipitate.

Starting with such a relatively firm, shredded, sifted and absorbent coprecipitate of aluminum hydroxide and pectin, we may add to each pound thereof, for instance, a mixture of 250 c. c. of pectate solution, 250 c. c. of tap water, and 6 grams of chalk. The enzyme solution, water, and chalk are mixed together, and the resulting mixture is quickly stirred into the coprecipitate. It is important to mix the enzyme, water, and chalk before adding the resulting mixture to the coprecipitate, because the pressed-out coprecipitate will absorb the liquid quickly and the pectase action is quite rapid. If the pectase, water, and chalk were stirred into the coprecipitate separately, the homogeneous mixture may not be obtained at once, and the pectase action may not be uniform throughout the coprecipitate.

The pectase solution may be prepared from orange or from lemon according to the disclosure in our copending application Serial No. 632,282, filed December 1, 1945, now abandoned entitled "Method of preparing a pectic substance." We also refer to our copending application Serial No. 632,283, filed December 1, 1945, now abandoned entitled "Method of preparing pectase," for detailed directions for the preparation of pectase solutions.

When pectase action has progressed to any desired point, the pectase action is terminated, preferably by adding to the reaction mixture enough alcohol (ethyl alcohol, isopropyl alcohol, or the like) to form a mixture containing about 40% alcohol. This addition of alcohol not only terminates the enzyme action but also dissolves out any material soluble in aqueous alcohol that might tend to interfere with subsequent extraction with acidified aqueous alcohol. The free aqueous alcohol is next drained off, as through a reel. To the drained off material we add sufficient alcohol to form a mixture containing preferably between 50 and 60% alcohol. To the resultant mixture we add sufficient acidified aqueous alcohol of the same concentration to bring down the pH of the mixture to about 1.00. The preferred acid employed is hydrochloric acid. By adding the acid mixed with alcohol to the pectic material admixed with alcohol, we avoid any dissolution of pectic material with consequent formation of slimy matter and incomplete washing out of impurities, calcium and aluminum compounds and the like. Ordinarily 50 c. c. of concentrated hydrochloric acid is sufficient to establish a pH of 1.00 in a mixture containing 1 lb. of coprecipitate. After the coprecipitate has been allowed to soak in the acidified aqueous alcohol for some time, the acidified aqueous alcohol is drained off. The washing with acidified aqueous alcohol is then repeated, using preferably for each pound of coprecipitate 8 fluid ounces of 80% alcohol and 10 c. c. of concentrated hydrochloric acid to maintain a pH of about 1.00. After a brief soaking this acidified aqueous alcohol is drained off, and the solid pectic material is thereafter washed repeatedly with high strength (about 80% alcohol until a pH of from 2.3 to 2.5 is reached. At that time the pectic material is washed with high strength alcohol containing sufficient sodium lactate to raise the pH to 3.0 or higher. After this washing with alcohol containing sodium lactate, the pectic material is ready to be pressed, vacuum dried, and pulverized to yield a pectinylic acid suitable for use in the preparation of jellies.

The efficiency of the above described washing with acidified alcohol may be tested as follows. A 100 grade pectinylic acid is prepared containing 10% sodium citrate and sufficient dextrose to reduce the jelly grade of the mixture to 100 grade.

When two grams of this 100 grade mixture are dissolved in 100 c. c. distilled water by boiling, the solution is allowed to cool, and 1 tablespoon of 5% vinegar is added (to effect a pH of 3.70 to 4.10) and no jelly is formed, but, at most, a slight increase in the viscosity is noted, the pectinylic acid may be considered sufficiently free from calcium. If the pectinylic acid is found by this test to contain an excessive amount of calcium, then the washing with acidified aqueous alcohol is repeated until the pectinylic acid passes the indicated test.

The time at which pectase action is terminated depends upon the desired calcium susceptibility and is determined as follows.

When an only slightly calcium susceptible pectinylic acid (hereinafter referred to as "jelly pectinylic acid") is desired, we use a 50% lactic acid solution having a pH of about 0.60. When a highly calcium susceptible pectinylic acid (hereinafter referred to as "custard pectinylic acid") is to be prepared, we use a 12½% solution of hydrochloric acid having a pH of about 0.10. We add 30 c. c. of one of these acid solutions to 100 c. c. samples of the aluminum hydroxide-pectin coprecipitate being treated. When, during the course of the pectase action, samples are taken from time to time of said coprecipitate and attempts are made to dissolve the samples in the acid solution, we note that solution of the samples takes place progressively more slowly until eventually, at a pH of 2.00 in the case of the lactic acid solution and at a pH of 0.70 when hydrochloric acid solution is used, the coprecipitate no longer goes into solution but only swells. When this end point is reached, the pectase action is terminated and washing with acidified alcohol is initiated, as disclosed hereinabove.

The above disclosed tests may conveniently be carried out by packing a 100 c. c. beaker with aluminum hydroxide-pectin coprecipitate being subjected to pectase treatment. The 100 c. c. of coprecipitate thus measured out are then transferred to a 250 c. c. beaker and 30 c. c. of 50% lactic acid are added. The resulting mixture will have a pH of about 2.00. If pectase action is terminated when the coprecipitate no longer dissolves at a pH of 2.00, the resulting product will be a pectinylic acid that is only slightly calcium susceptible and will have a temperature of set about room temperature or a time of set (in an 8 fluid ounce tumbler) of at least 20 minutes as a 65% sugar jelly having a pH of 2.60.

It should be noted that the aluminum hydroxide-pectin coprecipitate treated with pectase to the point of insolubility in dilute lactic acid at a pH of 2.00 will be soluble at a pH of 0.70 effected by the addition of hydrochloric acid.

The test with hydrochloric acid at a pH of 0.70 may be carried out similarly to the test with lactic acid described hereinabove.

We prepared, by the methods disclosed hereinabove, one batch of "jelly pectinylic acid" from pure 200 grade pectin and one batch of "custard pectinylic acid" from pure 250 grade pectin. Both these pectins were characterized by setting times of about 3 minutes in the preparation of 65% sugar jellies having a pH of 3.00.

The "jelly pectinylic acid" and "custard pectinylic acid" prepared as described may be characterized, by the terminology employed in our copending application Serial No. 616,654, as requiring for dissolution of their calcium jellies, respectively, pH values of 2.0 and 0.70. As also disclosed in our copending application 616,654, these pectinylic acids will be precipitated by soluble, ionizable calcium compounds even in the presence of sodium citrate or the like, if the pH falls below about 5.25 (for the jelly pectinylic acid) or below about 6.0 (for the custard pectinylic acid). It should be noted that the pH values required for dissolution of the calcium jellies of these pectinylic acids are those required for dissolution at room temperature.

B. STANDARDIZATION OF THE PECTINYLIC ACIDS PREPARED IN EXPERIMENT 1

*Experiment 2*

The jelly grades of the two pectinylic acids prepared as described in Experiment 1 were determined by the methods disclosed in our said copending application Serial No. 616,654. The "jelly pectinylic acid" was found to be 200 grade, while the "custard pectinylic acid" was found to be 250 grade.

From the 200 grade jelly pectinylic acid, a first 100 grade mixture was made up containing 50% of the 200 grade jelly pectinylic acid, 10% sodium citrate and 40% dextrose containing soluble, ionizable calcium compounds. This 100 grade mixture will be referred to as 100 grade jelly pectinylic acid "A."

A second 100 grade jelly pectinylic acid mixture was made up from 50% jelly pectinylic acid, 5% citric acid, 5% sodium citrate and 40% dextrose containing soluble, ionizable calcium compounds. This 100 grade mixture will be referred to as 100 grade jelly pectinylic acid "B."

A 100 grade mixture was prepared from the "custard pectinylic acid" containing 40 grams of said "custard pectinylic acid," 10 grams sodium citrate and 50 grams dextrose containing soluble, ionizable calcium compounds.

C. CHARACTERIZATION OF THE PECTINYLIC ACIDS OF EXPERIMENT 1 BY PREPARATION OF JELLIES FROM THE 100 GRADE SAMPLES OF EXPERIMENT 2 BY THE USE OF METHODS OTHER THAN THOSE OF THE PRESENT INVENTION

I. PREPARATION OF 65% SUGAR JELLIES FROM THE "JELLY PECTINYLIC ACID"

*Experiment 3*

First, we prepared from 100 grade jelly pectinylic acid "A" a 65% sugar jelly having a pH of 2.60 and a pectin to sugar ratio of 1:100 by the standard method described in our Patent No. 2,173,260 as used for the termination of setting time or, more accurately, temperature of set. The setting time noted in this determination was 27 minutes.

*Experiment 4*

We also prepared, from the 100 grade jelly pectinylic acid "A," apple and grape jellies containing 65% sugar and having a pectin to sugar ratio of 1:100 by the use of standard commercial apple cider (Martinelli) and grape juice (Welch), adding all the citric acid employed directly to the jelly batch in the kettle as disclosed in our said copending application filed of even date herewith. The apple jelly had a pH of 2.90 and the grape jelly a pH of 3.25. The calcium content of these juices had no very marked effect except that of increasing the viscosity of the syrups in the kettle. This is readily understood since the jelly pectinylic acid is not very calcium susceptible and its calcium combination is not precipitated or insolubilized at a sugar concentration of 65%, pH values around 3.0 and temperatures of 212° F. or higher, although the calcium susceptibility does effect an increased viscosity of the syrup in the kettle.

Experiment 5

In this experiment, the conditions of experiment 3 were duplicated, using the 100 grade jelly pectinylic acid "B." A hot 65% sugar syrup containing one part of said 100 grade pectinylic acid "B" for each 100 grams of sugar was made up with distilled water and poured into each of two 8 ounce tumblers containing, respectively, 2 c. c. and 4 c. c. of 50% citric acid solution. Perfect jellies were formed having pH values, respectively, of 2.90 and 2.60. The jelly having a pH of 2.60 required 27 minutes for complete setting.

Experiment 6

A 65% glucose jelly having a pectin to glucose ratio of 1:100 was made from 600 grams of 80% glucose (containing soluble, ionizable calcium compounds), 5 grams of the 100 grade jelly pectinylic acid "B," 200 c. c. tap water (containing 80 parts per million of calcium) and 25 grams sugar. More particularly, the pectin and the sugar were mixed, dissolved in the tap water at the boiling point and the glucose was then added hot. When the glucose was added to the sugar-containing pectin solution, the resulting mass seemed to preset in the kettle, i. e. definite signs of the gelatinization were noted. The syrup containing the pectinylic acid, the sugar and the glucose was boiled to 65% sugar concentration. The resulting hot syrup was poured into 8 ounce tumblers containing, respectively, 2 c. c., 3 c. c. and 4 c. c. of 50% citric acid. Complete jelly formation occurred at once in the tumblers. This rapid setting as well as the preset in the kettle are due to the soluble, ionizable calcium compounds contained in the glucose in sufficient amount to form more or less insoluble pectinylic acid-calcium combinations at the prevailing pH values, temperature and sugar concentrations.

II. Preparation of 70% Sugar Jellies From the "Jelly Pectinylic Acid"

Experiment 7

From the 100 grade jelly pectinylic acid "A" we prepared 70% sugar jellies having a pectin to sugar ratio of 1:100 as follows. 5 grams of this 100 grade mixture were dissolved in 300 c. c. distilled water to form a solution having a pH of 4.80. 500 grams of sugar were added to this solution, which was boiled to a sugar concentration of 70%. We noted that the solution boiled freely, no insulating layer formed on the sides of the kettle, and no burning or scorching occurred. Two 8 ounce tumblers were provided containing a 50% citric acid solution in amounts sufficient, respectively, to reduce the pH of the hot syrup to 3.00 and to 4.00 when poured into said tumblers. When the hot syrup was poured into these tumblers, we noted that at the pH of 3.00, a jelly formed in 27 minutes. However, at a pH of 4.00, a jelly set up almost immediately. This rapid setting is due to the formation of an pectinylic acid-calcium combination insoluble at a pH of 4.00 even at an elevated temperature, but soluble at a pH of 3.00 even at relatively low temperatures.

Experiment 8

Next, we made up from the 100 grade jelly pectinylic acid "A" another 70% sugar jelly having a pectin to sugar ratio of 1:66⅔. 7½ grams of the 100 grade pectinylic acid "A" were dissolved in 300 c. c. of distilled water, and 500 grams sugar were added. The resulting syrup was boiled to a 70% sugar content and was found to have a pH of 4.80. The syrup boiled freely. By the addition of sufficient acid to reduce the pH to 3.00, smooth jellies were obtained.

Experiment 9

Experiment 8 was repeated, with the addition of 1 c. c. of 50% citric acid solution along with the 500 grams of sugar. When the resulting syrup was boiled to a 70% sugar content, an insulating layer tended to form on the side of the kettle, and it was found difficult to prevent scorching of the syrup. The pH of the syrup was determined and found to be 3.90. To induce jelly formation, sufficient citric acid was added to effect a pH of 3.00, and it was noted that the syrup was thereby rendered more liquid. However, the jellies obtained on cooling of the acidified syrup were not smooth but granular.

It will be noted that the essential difference between the two jelly forming mixtures described in the Experiments 8 and 9 is the difference in pH value. At a pH of 4.80, the syrup was characterized by low viscosity and absence of any tendency to form any insulating layer on the kettle and to scorching. However, at a pH of 3.90, the syrup was quite viscous, formed an insulating layer on the sides of the kettle and tended to scorch. These differences are explained as follows. The soluble, ionizable calcium compounds present in the pectinylic acid dispersions are converted to calcium citrate by the sodium citrate. At a pH of 4.80, and at the boiling point of the syrup, calcium citrate is sufficiently insoluble to be unavailable for the formation of insoluble calcium-pectinylic acid combinations. However, at a pH of 3.90, calcium citrate is sufficiently soluble at the boiling point of the syrup to form a more or less insoluble calcium-pectinylic acid combination in the presence of 70% sugar.

When the pH is lowered in one step from 4.80 to 3.0, no trouble is encountered due to the formation of more or less insoluble calcium-pectinylic acid combinations, since the calcium combination of the "jelly pectinylic acid" is soluble at an elevated temperature at a pH of 3.0. However, at a pH of 3.90, the jelly pectinylic acid-calcium combination is at least partially insoluble at a temperature of around 212° F. and a sugar concentration of 70%. Hence, when the pH is reduced from 3.90 to 3.00, a jelly may be formed but the jelly is granular rather than smooth due to the presence of insolubilized calcium-pectinylic acid combinations in the jelly forming mix before the 70% sugar jelly is formed.

Experiment 10

Next, we prepared from the 100 grade jelly pectinylic acid "A" a jelly containing both sugar (sucrose) and glucose, having a pectin to sugar ratio of 1:63⅓ and containing about 73% total sugar (sucrose+glucose). 12 grams of the jelly pectinylic acid were dissolved (with a small amount of sugar) and 300 c. c. distilled water to form a solution having a pH of 5.10. The solution was brought to a boil and enough sugar added to make a total amount of 500 grams. No insulating layer formed on the sides of the kettle and no scorching was noted. The syrup was then boiled to 70% sugar concentration. Next 325 grams 80° Brix glucose was added. A decided change was almost immediately noticeable in the syrup. It lost its free flowing quality and had the appearance of being partially preset, i. e. definite signs of at least partial gelatinization were noted. A sufficient amount of citric acid was then added to give a pH of between 3.35 and 3.75. On cooling of the mixture, a granular jelly was obtained.

Experiment 11

Experiment 10 was repeated twice, using first a substantial amount of sodium acetate and then a substantial amount of sodium citrate. In both cases, granular jellies were obtained.

Experiment 12

We also prepared, as described in Experiment 10, and using the 100 grade jelly pectinylic acid "A," a syrup containing 70% sugar (sucrose and glucose) and having a pH of 3.90. As before, the syrup formed an insulating layer on the side of the kettle and was scorched.

III. PREPARATION OF 65% SUGAR JELLIES FROM "CUSTARD PECTINYLIC ACID" BY METHODS OTHER THAN THOSE OF THE PRESENT INVENTION

Experiment 13

65% sugar jellies having a pectin to sugar ratio of 1:100 were prepared from the above described 100 grade "custard pectinylic acid." The hot syrup was made up from 5 grams 100 grade custard pectinylic acid, 300 c. c. tap water (containing 80 parts calcium per million) and 500 grams of sugar. The syrup was boiled to 65% sugar concentration and poured into 8 ounce tumblers containing, respectively, 2 c. c., 3 c. c. and 4 c. c. of 50% citric acid solution. In the glass containing 4 c. c. of citric acid, a jelly was formed in 15 minutes. The syrup in the kettle appeared very viscous.

D. PREPARATION OF JELLIES FROM THE 100 GRADE SAMPLES OF EXPERIMENT 2 BY THE METHODS OF THE PRESENT INVENTION

I. PREPARATION OF 65% AND 70% SUGAR JELLIES FROM "JELLY PECTINYLIC ACID"

Experiment 14

We prepared from the 100 grade jelly pectinylic acid "A" a 73% sugar jelly containing both sugar (sucrose) and glucose and having a pectin to total sugar ratio of 1:63⅓. More particularly, we used 500 grams sugar, 325 grams 90° Brix glucose, 300 c. c. distilled water and 12 grams 100 grade jelly pectinylic acid "A." First the pectin was dissolved in the water with a small amount of the sugar to form a solution having a pH of 5.10. The solution was brought to a boil and the remaining sugar added. No insulating layer formed on the sides of the kettle and no scorching was noted. The syrup was then boiled to 70% sugar concentration. The glucose was next added. As noted in experiment 3B, the syrup then lost its free flowing quality and had the appearance of being partially preset. At this point we incorporated a 25% solution of sodium hexametaphosphate in small portions until the free flowing qualities of the syrup was reestablished. A sufficient amount of citric acid was then added to give a pH of between 3.35 and 3.75. On cooling of the mixture, a remarkably firm and smooth jelly was obtained.

Experiment 15

Next, using the 100 grade jelly pectinylic acid "B" we made up a 65% sugar jelly having a pectin to sugar ratio of 1:100 from 600 grams of 80% glucose, 5 grams of said 100 grade pectinylic acid, 200 c. c. tap water (containing 80 parts calcium per million) and 25 grams sugar. 5 c. c. of 25% sodium hexametaphosphate solution was added to the tap water when dissolving the pectinylic acid. The syrup containing the above specified ingredients was boiled to a 65% sugar concentration. When the glucose was added, the syrup remained smooth. No signs of presetting were noted. The hot syrup was poured into 8 ounce tumblers containing, respectively, 2 c. c. and 4 c. c. of 50% citric acid. Perfect jellies were obtained. In the glass containing 4 c. c. of 50% citric acid, jelly formed in not quite 2 minutes.

Experiment 16

Experiment 15 was repeated, this time using 10 c. c. of 25% sodium hexametaphosphate solution. The syrup obtained on addition of glucose was perfectly smooth. In the glass containing 4 c. c. of 50% citric acid, jelly formed in 11 minutes. The pH values of the jellies prepared, respectively, with 2 c. c., 3 c. c. and 4 c. c. of 50% citric acid amounted, respectively, to 2.90, 2.65 and 2.60.

Experiment 17

From the 100 grade jelly pectinylic acid "A" we made up a 70% sugar jelly having a pectin to sugar ratio of 1:66⅔. 7½ grams of the 100 grade pectinylic acid "A" were dissolved in 300 c. c. of distilled water, and 500 grams sugar were added along with 1 c. c. of 50% citric solution. The resulting syrup was boiled to 70% sugar content. An insulating layer tended to form on the side of the kettle and it was found difficult to prevent scorching of the syrup. Sufficient sodium hexametaphosphate was added to raise the pH of the syrup from its original value of 3.90 to the value of 4.20. The insulating and scorching tendency immediately disappeared and did not return when the pH value was restored to 3.90 by the addition of 50% citric acid. Excellent jellies were obtained from the syrup.

II. PREPARATION OF 65% SUGAR JELLIES FROM "CUSTARD PECTINYLIC ACID"

Experiment 18

Using the 100 grade custard pectinylic acid we made 65% sugar jellies having a pectin to sugar ratio of 1:100 from a syrup made up from 500 grams 100 grade custard pectinylic acid, 300 c. c. tap water (containing 80 parts calcium per million) and 500 grams of sugar. 5 c. c. of a 25% solution of sodium hexametaphosphate was added to the tap water. The syrup was boiled to a 65% sugar concentration and poured into 8 ounce tumblers containing, respectively 2 c. c., 3 c. c. and 4 c. c. of 50% citric acid solution. The syrup in the kettle was not objectionably viscous. A jelly formed within about 30 minutes in the tumbler containing 4 c. c. of 50% citric acid solution.

It will be noted that, in the preceding series of experiments, Experiments Nos. 3 through 13 are directed to methods of preparing jellies by methods other than those of the present invention, while Experiments 14 through 18 cover methods of preparing jellies according to the present invention. Certain experiments in the first group are closely correlated with other experiments in the second group, as will be indicated hereinbelow.

As shown in Experiment No. 6, a 65% sugar syrup made up exclusively of glucose presets in the kettle and, when poured into tumblers containing small amounts of acid forms jellies immediately. As shown by Experiments Nos. 15 and 16, however, smooth syrups of suitable viscosity are obtained when sodium hexametaphosphate is added to the 65% sugar syrup made up from glucose, and a setting time of as much as eleven minutes is obtained. This elimination of presetting or undue viscosity in the kettle and prolongation of the setting time is due to the sequestering, by the sodium hexametaphosphate, of the soluble, ionizable calcium compounds contained in the glucose.

A similar reduction in viscosity of kettle syrup and prolongation of setting time due to the use of sodium hexametaphosphate is shown by a comparison of Experiments 13 and 18. A comparison between Experiments 10 and 14 also shows the elimination of pre-setting in the kettle by the use of sodium hexametaphosphate.

Experiment 17 is of particular interest as showing that the effects of sodium hexametaphosphate is independent of pH values, i. e., that the effects of sodium hexametaphosphate is not comparable to the effects of a buffer salt. Experiment 11 shows that buffer salts are incapable of producing the effect obtained by the use of sodium hexametaphosphate.

It will be noted that all the pectinylic acids employed for jelly making in Experiments 3 through 18 may be characterized as requiring pH values of 2.0 or less for dissolution of their calcium combinations at room temperature and in the absence of sugar and of sodium citrate or the like. As disclosed on page 33 of our said copending application, Serial No. 616,654, when dealing with pectinylic acids characterized by a pH of 2.0 for calcium jelly formation (at room temperature and in the absence of sugar and of sodium citrate or the like), it is necessary to establish a pH at least as high as 5.25 if it is desired to eliminate the formation of insoluble calcium combinations by the use of sodium citrate, at room temperature and in the absence of sugar. In other words, in order to prepare two percent dispersions of pectinylic acids having the indicated pH of calcium jelly formation in the presence of soluble, ionizable calcium compositions by the use of sodium citrate, it is necessary to maintain a pH at least as high as 5.25.

On the other hand, by the use of sodium hexametaphosphate or other calcium sequestering compounds according to the present invention, it is possible completely to eliminate the formation of insoluble pectinylic acid-calcium combinations at pH values ranging from 2.0 to 5.2 or higher, even in the presence of sugar and when using pectinylic acids having a calcium susceptibility requiring a pH of 2.0 or less for dissolution of the calcium-pectinylic acid combinations (at room temperature and in the absence of sugar and sodium citrate).

When preparing 65% or more concentrated sugar jellies according to the present invention, we preferably employ pectinylic acids capable of forming 65% sugar jellies (of the type obtainable in the complete absence of soluble, ionizable calcium compounds) at a jelly pH of 2.60 and with a setting time of at least 10 and preferably at least 20 minutes. The hot sugar syrups containing such dispersed pectinylic acids may contain up to 80% sugar and preferably have a pH value of from 3.80 to 5.20. The ratio of pectinylic acid to sugar preferably is at least 1:60 and may range up to 1:100. Jelly formation is induced by reducing the pH value of the hot syrup below 3.80 but not below 2.00. The preferred pH value of the jelly is from 2.60 to 3.70.

The sodium hexametaphosphate employed for sequestering the soluble, ionizable calcium compounds of the jelly batch may be incorporated with the dry pectin, with the water or other aqueous liquids employed for making up the jelly batch, with the sugar or with the kettle syrup.

The amount of sodium hexametaphosphate to be used when proceeding according to the present invention will vary according to the calcium susceptibility of the particular pectinylic acid being employed, its calcium content, and the calcium content of the other ingredients of the jelly batch, such as water, sugar, glucose, fruit juices and the like. One method of determining the amount of sodium hexametaphosphate to be used is described hereinbelow.

First, the pectinylic acid is standardized to form a 100 grade mixture containing 10% sodium citrate and sufficient dextrose to reduce the jelly grade to 100. Then the above described test with vinegar for the presence of excessive calcium is carried out. When the 100 grade mixture passes this test, a 65% sugar syrup is made up from 5 grams of the 100 grade mixture, 300 c. c. distilled water and 500 grams sugar. These ingredients are boiled until the sugar concentration reaches 65%. Next, the hot syrup is poured into three 8 ounce tumblers containing, respectively 2 c. c., 3 c. c. and 4 c. c. of 50% citric acid. The temperature of set or time of set in each tumbler on cooling is noted. The pH values in the jellies thus obtained will ordinarily be around 2.75 (with 2 c. c. of 50% citric acid), 2.65 (with 3 c. c. of 50% citric acid) and 2.55 (with 4 c. c. of 50% citric acid). The temperature of set or time of set noted for these three pH values afford a measure of the lowering in temperature of set or increase in time of set effected by the action of pectase.

Next, using the same 100 grade pectinylic acid mixture and the same method of preparation, we substitute, for the distilled water, tap water or fruit juice in the amount used in commercial jelly production. If glucose or the like are to be employed along with or in place of sugar, the corresponding substitution or addition is also made. In other words, we make up jellies from the above described 100 grade pectinylic acid mixture by using a commercial recipe. The setting time of the commercial type jellies thus obtained is carefully noted. Next, additional batches of jelly are made up from the 100 grade pectinylic acid mixtures using the commercial recipe and adding increasing amounts of sodium hexametaphosphate until the setting time or temperature of set of the distilled water jellies is reached.

The amount of sodium hexametaphosphate found necessary to equal the setting time or temperature of set of the distilled water jelly represents the minimum amount of sodium hexametaphosphate that should be employed for best results. However, an excess of the sodium hexametaphosphate only changes the pH of the jelly or jam slightly, and since this slight increase in pH can be compensated for by the addition of acid, we prefer to add somewhat more sodium hexametaphosphate than the minimum required for satisfactory jelly formation. Ordinarily about one part of sodium hexametaphosphate for each four parts of 100 grade pectinylic acid is quite satisfactory. This sodium hexametaphosphate may be incorporated with the pectinylic acid prior to jelly making to form a pectinylic acid-sodium hexametaphosphate mixture suitable for the preparation of jellies containing 65% or more sugar. It is also possible to add the sodium hexametaphosphate to the water used in jelly making or to a jelly batch.

Many details of composition and procedure may be varied within a wide range without departing from the principles of this invention and without sacrificing the advantages disclosed hereinabove and it is therefore not our purpose to limit the patent granted on this invention otherwise than necessitated by the scope of the appended claims.

We claim as our invention:

1. In the method of making jellies and the like from an aqueous dispersion of a calcium susceptible pectinylic acid and at least 65% sugar, the pectinylic acid having been prepared by the enzymatic action of pectase upon an aqueous pectin material at a pH maintained at above 5.3 and at a temperature below 160° F., the improvement whereby there is prevented any pre-setting of said dispersion prior to gel formation such as would otherwise occur due to the presence of calcium ions in such dispersion, comprising the step of incorporating into said aqueous dispersion an amount of sodium hexametaphosphate effective to prevent such premature thickening.

2. In the method of making jellies and the like from an aqueous dispersion of a calcium susceptible pectinylic acid and at least 65% sugar, the pectinylic acid having been prepared by the enzymatic action of pectase upon an aqueous pectin material at a pH maintained at above 5.3 and at a temperature below 160° F., the improvement whereby there is prevented any pre-setting of said dispersion prior to gel formation such as would otherwise occur due to the presence of calcium ions in such dispersion, comprising the step of incorporating into said aqueous dispersion an amount of sodium hexametaphosphate effective to prevent such pre-setting, such amount of sodium hexametaphosphate being of the order of 25% by weight of 100 grade pectinylic acid equivalent to the pectinylic acid actually present in said dispersion.

3. A composition for making jellies and the like of at least 65% sugar content, said composition comprising a mixture of calcium susceptible pectinylic acid and sodium hexametaphosphate, said pectinylic acid having been prepared by the enzymatic action of pectase upon an aqueous pectin material at a pH maintained at above 5.3 and at a temperature below 160° F., and said sodium hexametaphosphate being present in an amount sufficient to prevent any pre-setting of an aqueous dispersion of said mixture containing at least 65% sugar such as would otherwise occur due to the presence of calcium ions in said dispersion.

4. A composition for making jellies and the like of at least 65% sugar content, said composition comprising a mixture of calcium susceptible pectinylic acid and sodium hexametaphosphate, said pectinylic acid having been prepared by the enzymatic action of pectase upon an aqueous pectin material at a pH maintained at above 5.3 and at a temperature below 160° F., and said sodium hexametaphosphate being present in an amount sufficient to prevent any pre-setting of an aqueous dispersion of said mixture containing at least 65% sugar such as would otherwise occur due to the presence of calcium ions in said dispersion, such amount of sodium hexametaphosphate being of the order of 25% by weight of 100 grade pectinylic acid equivalent to the pectinylic acid actually present in said mixture.

HERBERT T. LEO.
CLARENCE C. TAYLOR.
JOHN W. LINDSEY.

REFERENCES CITED

The following references are of record in the file of this patent:

UNITED STATES PATENTS

| Number | Name | Date |
|---|---|---|
| 1,513,615 | Leo | Oct. 28, 1924 |
| 2,115,479 | Beach | Apr. 26, 1938 |
| 2,132,065 | Wilson | Oct. 4, 1938 |
| 2,207,299 | Mnookin | July 9, 1940 |
| 2,334,281 | Olsen et al. | Nov. 16, 1943 |
| 2,358,430 | Willaman et al. | Sept. 19, 1944 |